United States Patent Office 3,365,499
Patented Jan. 23, 1968

3,365,499
OXIDATION OF OLEFINS TO KETONES
William H. Clement, Blairsville, and Charles M. Selwitz, Pitcairn, Pa., assignors to Gulf Research & Development Company, Pittsburgh, Pa., a corporation of Delaware
No Drawing. Filed July 11, 1963, Ser. No. 294,268
20 Claims. (Cl. 260—597)

ABSTRACT OF THE DISCLOSURE

Carbonyl containing compounds, such as methyl ketones, are prepared by a process as follows:

adding water at a rate between 0.2 and 3.6 mols per mol of olefin to a reaction mixture of—
(a) an olefin having between 6 and 40 carbon atoms;
(b) a catalyst comprising a compound of a metal of the platinum group;
(c) a soluble organic oxidizing agent such as a quinone which has an oxidation potential higher than that of the platinum group metal; and
(d) an aprotic organic solvent, such as dimethylformamide, which has a dielectric constant at 25° C. of at least 20.

---

This invention relates to an improvement in the preparation of carbonyl compounds by the oxidation of olefinically unsaturated compounds having at least six carbon atoms per molecule and more particularly to the preparation of methyl ketones from alpha-olefins having at least six carbon atoms per molecule.

In recent years the so-called "Consortium" or Wacker process has been developed for the preparation of carbonyl compounds by the oxidation of ethylenically unsaturated compounds and, in particular, for the preparation of acetaldehyde from ethylene. The "Consortium" process is described, for example, in "Catalytic Reactions of Olefins on Platinum Metal Compounds," Angewandte Chemie, 71, 176–182 (1959). The "Consortium" process suffers, however, from certain disadvantages, such as reduced conversions and isomerization of the charge stock and products when olefinically unsaturated compounds having six carbon atoms per molecule, or over, are utilized as the charge stocks. These disadvantages have been overcome by the improved process of the subject invention.

In accordance with the invention, a carbonyl containing compound is prepared in improved yields and in high purity from an olefinically unsaturated compound having at least six carbon atoms per molecule and at least one hydrogen atom on each carbon atom of at least one olefinic double bond by a process which comprises adding water at a rate between 0.2 and 3.6 mols of water per hour per mol of olefinically unsaturated compound to a reaction mixture comprising said olefinically unsaturated compound, a catalyst comprising a compound of a metal of the platinum group, a soluble organic oxidizing agent having an oxidation potential higher than that of the platinum group metal, and an aprotic organic solvent which has a dielectric constant at 25° C. of at least 20.

It was found, as described above, that conversion of the higher molecular weight olefinically unsaturated compounds in an aqueous acid medium was unsatisfactorily poor. It has now been found quite unexpectedly that improvements in the yields of carbonyl containing compounds can be obtained when organic oxidizing agents soluble in the reaction medium are employed, by the simple expedient of adding water slowly to a reaction mixture comprising an olefinically unsaturated compound containing at least six carbon atoms per molecule, a solvent to be hereinafter defined, and the organic oxidizing agent, rather than adding the olefin slowly to a reaction mixture comprising the water, a solvent, and an oxidizing agent.

The solvent can be any organic compound or mixture of organic compounds which is liquid under the conditions of the reaction, which is aprotic and which has a dielectric constant at 25° C. of at least 20. By an aprotic solvent is meant one which does not have a hydrogen atom directly connected to an oxygen atom. There is, therefore, an absence of hydroxyl groups in an aprotic solvent, that is, an aprotic solvent is free of hydroxyl groups. The solvent must be aprotic to insure that it will not react with the olefinically unsaturated charge stock in the presence of the platinum group metal catalyst to form compounds such as vinyl ethers and vinyl acetates before sufficient water is present in the reaction medium to promote the desired formation of the carbonyl containing compounds. The preferred solvents are those which have a dielectric constant at 25° C. between 20 and 60 and the more preferred solvents are those which have a dielectric constant at 25° C. between 30 and 50. The most preferred solvent is dimethylformamide, which has a dielectric constant at 25° C. of 37. Examples of other suitable solvents include dimethylsulfoxide and dimethylacetamide. The dielectric constants of these two materials at 25° C. are 45 and 37.8, respectively.

The suitability of any particular organic compound or mixture of organic compounds for use as a solvent in the subject reaction can easily be determined by one skilled in the art by obtaining the dielectric constant of the organic compound or mixture of compounds at 25° C. and determining by any suitable procedure, for example by infra red analysis, whether the organic compound or mixture of compounds contains a hydrogen atom directly connected to an oxygen atom. If the dielectric constant is less than 20 at 25° C., the organic compound is unsuitable. In like manner, if the compound contains a hydrogen atom directly connected to an oxygen atom, it is unsuitable for use as a solvent in the process of this invention.

The charge stock can be any olefinically unsaturated compound having at least six carbon atoms per molecule and which has at least one hydrogen atom on each carbon atom of at least one olefinic double bond. The charge stock is preferably an olefinically unsaturated compound which has between 6 and 40 carbon atoms per molecule and more preferably between 6 and 20 carbon atoms per molecule. In addition, the preferred charge stocks are the olefinically unsaturated hydrocarbons having between 1 and 4 olefinic double bonds. The more preferred charge stocks are the aliphatic monoolefinic hydrocarbons having between 6 and 20 carbon atoms per molecule. The most preferred charge stocks are the aliphatic alpha monoolefinic hydrocarbons having between 6 and 20 carbon atoms per molecule. Suitable specific examples of olefinic unsaturated compounds include hexene-1; heptene-1; octene-1; nonene-1; decene-1; undecene-1; dodecene-1; tridecene-1; tetradecene-1; pentadecene-1; hexadecene-1; heptadecene-1; octadecene-1; nonadecene-1; eicosene-1; heneicosene-1; docosene-1; tricosene-1; tetracosene-1; pentacosene-1; hexacosene-1; heptacosene-1; octacosene-1; nonacosene-1; triacontene-1; hentriacontene-1; dotriacontene-1; tritriacontene-1; tetratricontene-1; nonene-3; decene-4; 7-methyldecene-2; 7-methyldecene-1; 6,9-diethylundecene - 1; 5,7 - dimethyldodecene - 1; 4,7,9 - trimethyltridecene - 1; 5 - butyltetradecadiene - 1,5; 8 - phenylpentadecene - 1; 7 - cyclohexylhexadecene - 1; 11(alpha-cumyl)heptadecene - 1; 6 - butyloctadecadiene - 1,11; 5-(2-norbornyl)nonadecene-1; 6-ethyleicosene-1; 8-t-butyltricosene - 1; 7 - phenyldocosene-1; 4 - methyloctene - 1;

4 - methylpentadecene - 1; 5 - methylpentadecene - 1; 8-methylpentadecene-1; 9-methylpentadecene-1; 10-phenyldecene-1; 10-cyclohexyldecene-1; 10-cyclooctyldecene-1; 4,5,6,7-tetramethyloctene-1; 4,6,7-trimethyldecene-1; 4,6,7 - trimethyldodecene - 1; 7 - hydroxyoctene - 1; 9-chlorononene-1; 5-methoxydecene-1; 7,11-diphenylundecene-1; 11-dodecen-1-al; 8-ketotridecene-1; 9-aminotetradecene-1; 14-cyanopentadecene-1; 10-undecenoic acid; 15-n-hexadecenoic acid; isooctyl 16-heptadecenoate; 12-(alphacumyl)octadecene-1; 14-ketononadecene-1; 20-N-acetoxyaminoeicosene-1; 17,18-dinitroheneicosene-1; 22-p-tolyldocosene-1; 20-(bi-thieno)tricosene-1; 20-(alpha-naphthyl)tetracosene-1; 12-keto-23-thiapentacosene-1; 12-hydroxyhexacosene-1; 17-bromoheptacosene-1; 28-cyanooctacosene-1; 20-acetoxynonacosene-1; 18-butoxytriacontene-1; 9-mercaptohentriacontene-1; 30-thiadotriacontene-1; 30-oxatritriacontene-1; 24-azatetratriacontene-1; 4-trimethylsilylhexene-1; 1,2-epoxyheptene-6; 2-(7-methyl-11-decenyl)-1,4-benzoquinone; 10,11-difluoro-6,9-diethylundecene-1; 5,7-dimethyl-6-oxadodecene-1; 4,7-dimethyltridec-1-ene-9,10,11,12-tetracarboxylic dianhydride; 4-butyltetradecadiene - 1,5; 8 - (p - chloromercuriphenyl)pentadecene-1; 7-(4-nitrocyclohexyl)hexadecene-1; 11-(alphacumyl)heptadecene-1; 6-(para-isopropylphenyl)decene-1; 10 - (2 - norbornyl)nonadecene - 1; 6 - butyloctadecadiene-1,11; 8-t-butyl-12-(2-[4-dichloromethyltetrahydrofuryl])tetradecene-1; 7-phenyl-10-(2-[6,6-dibromo-3-oxabicyclo(3.1.0)hexyl])docosene-1; 4-methyloctene-1; 4-methylpentadecatetraene - 1,4,7,12; diethyl 14 - pentadecenylsuccinate; 8-diazomethylpentadecene - 1; 9 - carboxymethylpentadecene-1; 10-(2,3-diiodophenyl)decene-1; 10-(1,4-cyclohexadienyl)decene-1; 10 - cyclopentyldecadiene-1,10; 4,7 - diketo - 10 - cyclooctyldecene - 1; 4,5,6,7 - tetrachloromethyloctene - 1; 4,6,7 - trinitromethyldecene-1; and 4,6,7-tri(phenoxymethyl)dodecene-1.

Mixtures of olefinically unsaturated compounds can also be employed. Suitable mixtures of olefinically unsaturated compounds are olefins obtained by the thermal cracking of wax and from the polymerization of ethylene.

The products from the reaction are carbonyl containing compounds which include ketones, aldehydes and organic acids. The principal product is the ketone, and if an alpha-olefin is utilized as the charge material, a methyl ketone is almost exclusively the product obtained.

Materials such as mercaptans and amines which form stronger ligand bonds with the platinum group metal compound than does the olefin charge stock are, of course, unsuitable charge stock components and should suitably be removed.

The process of the present invention can be carried out with a catalyst comprising a compound of a noble metal of Group VIII of the Periodic Table (a platinum group metal compound) which includes metals, such as ruthenium, rhodium, palladium, osmium, iridium and platinum. The preferred metal compounds are those of palladium and platinum. It is still more preferred to use the water soluble salts of palladium and platinum, such as the halides, sulfates or phosphates. The most preferred catalyst is palladium chloride. Suitable specific examples of catalysts which can be used either alone or in admixture to promote the process of the subject invention include platinum chloride, platinum sulfate, palladium acetate, palladium chloride and palladium sulfate.

The amount of the platinum group metal compound required to promote the subject reaction can vary over a wide range. The amount of the platinum group metal compound based on the olefinically unsaturated charge stock can vary between 0.1 and 50 weight percent and preferably between 1 and 25 weight percent.

In the subject process the platinum group metal compound is reduced while promoting the oxidation of the olefin by forming a complex with the olefinicially unsaturated compound which then decomposes to form the platinum group metal and the carbonyl compound. The reduced platinum group metal compound is inactive to promote further oxidation until it is again in a proper oxidation state. It is preferred to also have present in the reaction mixture an oxidizing agent which, while not reacting with the olefinically unsaturated compound, the reaction solvent or the reaction products would be capable of oxidizing the platinum group metal compound to an active state. Thus, the platinum group metal compound could be used in stoichiometric quantities to produce the desired carbonyl compounds, but in order for the platinum group metal compound to function as a catalyst and not as a reactant, it must be re-oxidized to the proper valence state. In view of the expense of the platinum group metal compounds, the re-oxidation of the platinum group metal compound is the only practical means of operating the subject process. It is therefore preferred to have present in the reaction mixture an oxidizing agent which has an oxidation potential higher than that of the platinum group metal compound employed. The oxidation potential of any particular agent can be determined from the International Critical Tables or other literature sources, or by suitable known testing procedures.

It would be desirable, of course, to re-oxidize the platinum group metal with an oxidizing gas such as oxygen, but this reaction does not occur readily. It has been found that certain organic compounds, for example the quinones, are suitable oxidizing agents. It is important that the organic oxidizing agent be soluble with the olefinically unsaturated charge stock so as to intimately contact the platinum group metal compound for purposes of re-oxidation. The oxidizing agent can, therefore, be any organic material which is soluble in the reaction medium and which has an oxidation potential higher than that of the platinum group metal compound employed as the catalyst. The preferred oxidizing agents are the quinones which are soluble in the reaction medium and which have an oxidation potential higher than that of the platinum group metal compound employed as the catalyst. Particularly preferred are the ortho- and para-quinones, such as benzoquinone, naphthaquinones, anthraquinones, phenanthrenequinones or the alkyl substitution products of such quinones or the sulfonic or carboxylic acid derivatives of such quinones. Specific examples of suitable quinones include 2-methyl-1,4-benzoquinone; 9,10 - phenanthrenequinone; 7-butylnaphthaquinone; anthraquinone-1-carboxylic acid; 1,2-naphthaquinone-4-sulfonic acid; 2,3,5,6-tetrachloro-1,4-benzoquinone; and duroquinone.

Other organic oxidizing agents can also suitably be employed, such as the organic peroxides, organic halamides, organic halimides and organic hypohalites. Specific examples of suitable compounds include t-butyl hydroperoxide, cumene hydroperoxide, di-t-butyl peroxide, diacetyl peroxide, N-chloroacetamide, N-bromo-succinimide, t-butylhypochlorite and trifluoroperacetic acid.

Although the organic oxidizing agents are difficult to re-oxidize with an oxygen containing gas, any oxygen containing gas can suitably be passed through the reaction medium to effect some re-oxidation. Suitable oxygen containing gases include oxygen, air and oxygen enriched air.

The amount of oxidizing agent to employ can vary over a wide range, for example, between 1 and 50 weight percent based on the total reaction mixture, with preferred amounts between 5 and 25 weight percent.

In the process of the present invention, the water is added at a slow rate to the reaction mixture comprising the olefinically unsaturated charge stock, the platinum group metal compound, the solvent and the organic oxidizing agent. If the water is added too slowly, the rate of reaction is too slow to be of interest. If the water is added too quickly, the concentration of water in the reaction mixture will increase and tend, in certain cases, to inhibit the conversion of the olefinically unsaturated charge stock to the desired carbonyl containing compounds. Thus, when dimethylsulfoxide is employed as the reaction solvent, too high a water concentration results in unsatisfactorily low conversions. A suitable water addition rate has been found to be between 0.2 and 3.6 mols of water per hour per mol of olefinically unsaturated compounds in the reaction mixture. The preferred rate of water addition is between 0.5 and 1.5 mols per hour per mol of olefin charge stock and the most preferred rate of water addition is about 1 mol per hour per mol of olefin charge stock.

The final water concentration can vary between 1 and 50 weight percent of the amount of solvent employed, with preferred concentrations between 5 and 30 weight percent. The most preferred final water concentrations will depend in part on the particular solvent employed. For example, when dimethylformamide is employed as the solvent, the preferred final water concentration is between 5 and 20 weight percent based on the amount of dimethylformamide.

The reaction conditions should be such that the reactants are maintained essentially completely in the liquid phase. The reaction temperature can be between about 0° and 150° C., preferably between 20° and 100° C. and more preferably between 60° and 70° C.

Atmospheric or even a reduced pressure can be used at the lower reaction temperatures. Pressures up to 100 atmospheres or more can, however, also be used, if desired. The function of the pressure is, as noted above, to maintain the solvent and the aqueous solution of catalyst in the liquid phase.

The reaction time should be sufficient for the olefinically unsaturated compound to be converted to the desired carbonyl containing compound. Reaction times between 0.1 and 10 hours are generally satisfactory. Reaction times below 1.0 hour are generally unsatisfactory from a conversion viewpoint while reaction times above about 10 hours provide no additional benefits.

The process will be further described with reference to the following specific examples.

EXAMPLE 1

A solution containing 0.010 mol (1.8 grams) of Pd $Cl_2$; 0.050 mol (5.4 grams) of parabenzoquinone; 0.140 mol (2.5 grams) of water and 25 milliliters of dimethylformamide was prepared. The dielectric constant for dimethylformamide at 25° C. is 37. To this solution was added 8.4 grams of hexene-1 with vigorous stirring at room temperature (25° C.). An immediate exotherm was observed which was controlled by an ice water bath from 50° C. to 25° C. in five minutes. The temperature was then held at 25° C. without the ice water bath. The solution was stirred at room temperature for twenty hours and then flooded with an excess solution of saturated sodium chloride to stop the reaction. The organic layer was separated and analyzed by vapor phase chromatography. The product showed 0.0416 mol of ketone (98 percent 2-hexanone) giving a ketone yield of 69 percent.

EXAMPLE 2

Example 1 was repeated except the amounts of palladium chloride, quinone, solvent and hexene-1 were doubled and the reaction procedure was different. In this run, the palladium chloride, quinone, hexene-1 and solvent were mixed initially and 2 grams of water were added to the reaction mixture dropwise over a one hour period while maintaining a temperature at 20°–30° C. with external cooling. The reaction was stirred for 0.5 hour, then an additional one gram of water was added over a ten minute period. The reaction was stirred for an additional 1.5 hours and then another one gram of water was added over a one minute period. The reaction was stirred an additional 66 hours at room temperature and then distilled. The organic material analyzed 85 percent ketone (9.7 grams) and 15 percent unconverted hexene (1.7 grams). The ketone analysis by vapor-phase chromatography showed 98 percent hexanone-2 and 2 percent hexanone-3. There was an 81 percent yield of ketone.

A comparison of the results of Examples 1 and 2 above shows the improvement in yield of product by employing the procedure of the subject invention. Thus, by adding the water to the reaction mixture comprising the solvent and olefinically unsaturated charge stock rather than adding the olefinically unsaturated charge stock to a reaction mixture comprising the water and solvent, a 12 percent increase in yield of ketone (69 to 81 percent) is obtained.

EXAMPLE 3

Example 1 was repeated except the olefin charge was dodecene-1, the reaction temperature was higher, the quantities of materials used in the reaction mixture were doubled and the olefin was added dropwise to the solution with stirring over a three-hour period. Before the dodecene-1 was added, the mixture of palladium chloride, quinone, dimethylformamide and water were mixed and heated to 60° to 70° C. The olefin was then added dropwise to the solution with stirring over a three-hour period. After an additional 0.5 hour of reaction there was a 21 percent conversion of the dodecene-1 to 2-dodecanone.

EXAMPLE 4

Example 3 was repeated except 7 grams of water were employed and the olefin was added over a six-hour period. After an additional one hour of reaction, there was 9.5 percent conversion of the docecene-1 to the methyl ketone.

EXAMPLE 5

Example 3 was repeated except 4 grams of water were employed and the reaction procedure was different. The palladium chloride, quinone, dimethylformamide and dodecene-1 were mixed and four grams of water were added incrementally over a two and one-half hour period. The reaction temperature was maintained at 70° C. The reaction was worked up after a total reaction time of three hours. The conversion to dodecanone-2 was found to be 77 percent.

A comparison of Example 5 with Examples 3 and 4 illustrates again the importance of adding the water to a mixture of the solvent and the olefinically unsaturated charge material.

EXAMPLE 6

A reaction mixture was prepared consisting of 0.02 mol (3.56 grams) of palladium chloride (Pd $Cl_2$); 0.02 mol (3.40 grams) of copper chloride (Cu $Cl_2 \cdot 2H_2O$); 7 grams of water; and 50 millileters of dimethylsulfoxide. The dielectric constant of dimethylsulfoxide at 25° C. is 45. The temperature of the reaction mixture was increased to 60° C. Oxygen at the rate of 3.3 liters per hour was passed through the solution and dodecene-1 was added continuously over a two and one-half hour period into the reaction phase with stirring. The total amount of added olefin was 0.20 mol (33.6 grams). The reaction temperature was maintained between 60° and 70° C. Following complete addition of the olefin, the reaction mixture was stirred an additional 0.5 hour at 60° to 70° C. The percentage conversion of dodecene-1 was less than 10 percent.

EXAMPLE 7

Example 6 was repeated except the oxidizing agent (copper chloride-oxygen) was replaced with 0.10 mol (10.8 grams) of parabenzoquinone, only 6 grams (instead of 7) of water were employed, and the procedure was different. In this example, the reactants minus the water were mixed and four grams of water were slowly added. The reaction temperature was maintained between 80° and 90° C. At the end of one hour, 2 additional grams of water were added and the reaction continued for twenty hours at 80° to 90° C. The weight percent dodecanone in the product after 1, 3.5 and 20 hours of reaction was respectively 23, 44 and 49 percent. The theoretical amount of dodecanone which could have been produced based on the amount of quinone available to re-oxidize the platinum was 62 percent. The yield of ketone was therefore 79 percent based on the theoretical yield possible.

A comparison of Example 7 with Example 6 shows again the advantage of the process of this invention in increasing the yield of desired ketone from olefinically unsaturated charge stocks having at least six carbon atoms per molecule. By adding the water to the mixture of olefin, solvent, platinum group metal catalyst and oxidizing agent as in Example 7, rather than the olefin to an aqueous solution of the solvent, catalyst and oxidizing agent as in Example 6, a yield of 79 percent ketone is achieved contrasted with a yield of less than 10 percent.

The subject process has a number of advantages over processes known in the art for the conversion of olefinically unsaturated compounds having six carbon atoms or more per molecule. When using solvents as defined above and adding the water slowly to the reaction mixture containing the olefin as also defined above, excellent yields of higher molecular weight methyl ketones of high purity are obtained. One of the disadvantages of processes in the prior art, such as the use of aqueous hydrochloric acid as the reaction medium, was the formation of undesired internal ketones. By employing solvents, such as dimethylformamide and utilizing a regulated addition of water into the reaction mixture comprising the solvent and olefin, it has been found possible to obtain excellent product yields in excellent purity.

In addition, when it is desirable to avoid the use of an oxygen containing gas for fear of degradation of the product or otherwise, the various quinones such as para-benzoquinone are readily utilized to re-oxidize the platinum group metal catalyst.

Resort may be had to such variations and modifications as fall within the spirit of the invention and scope of the appended claims.

We claim:

1. A liquid phase process for the preparation of carbonyl containing compounds which comprises adding water to a reaction mixture comprising an unsaturated hydrocarbon having from 6 to 40 carbon atoms per molecule and wherein the unsaturation in said hydrocarbon resides solely in from 1 to 4 olefinic double bonds, and wherein there is at least one hydrogen atom on each carbon atom of at least one of said olefinic double bonds, a catalyst comprising a water soluble salt of a metal of the platinum group, an organic oxidizing agent soluble in the reaction mixture having an oxidation potential higher than that of the platinum group metal, and an aprotic organic solvent which has a dielectric constant at 25° C. of at least 20, said water being added to said reaction mixture at a rate between 0.2 and 3.6 mols of water per hour per mol of olefinically unsaturated hydrocarbon in the reaction mixture, said reaction mixture being at a temperature between 0° and 150° C., and wherein the water addition is continued until the water content reaches a total of from 1 to 50 weight percent of the amount of solvent.

2. A process according to claim 1 wherein the soluble organic oxidizing agent is a quinone.

3. A process according to claim 1 wherein the compound of a metal of the platinum group is selected from the group consisting of compounds of palladium and platinum and the aprotic organic solvent has a dielectric constant at 25° C. between 20 and 60.

4. A process according to claim 1 wherein the catalyst is palladium chloride.

5. A process according to claim 1 wherein water is added to said reaction mixture at a rate between 0.5 and 1.5 mols of water per mol of olefinically unsaturated compound per hour.

6. A process according to claim 1 wherein the aprotic organic solvent is selected from the group consisting of dimethylacetamide, dimethylformamide and dimethylsulfoxide.

7. A liquid phase process for the preparation of methyl ketones which comprises adding water to a reaction mixture comprising an alpha-olefin having from 6 to 40 carbon atoms per molecule and at least one hydrogen atom on each carbon atom of the alpha-olefinic double bond, a catalyst comprising a water soluble salt of a metal of the platinum group, an organic oxidizing agent soluble in the reaction mixture having an oxidation potential higher than that of the platinum group metal, and an aprotic organic solvent which has a dielectric constant at 25° C. of at least 20, said water being added to said reaction mixture at a rate between 0.2 and 3.6 mols of water per hour per mol of olefinically unsaturated compound in the reaction mixture, said reaction mixture being at a temperature between 0° and 150° C., and wherein the water addition is continued until the water content reaches a total of from 1 to 50 weight percent of the amount of solvent.

8. A process according to claim 7 wherein the alpha-olefin is an aliphatic alpha-olefin having between 6 and 20 carbon atoms per molecule.

9. A process according to claim 8 wherein the soluble organic oxidizing agent is a quinone, wherein the compound of a metal of the platinum group is selected from the group consisting of the compounds of palladium and platinum, and wherein the aprotic organic solvent has a dielectric constant at 25° C. between 20 and 60.

10. A process according to claim 9 wherein the compound of a metal of the platinum group is palladium chloride.

11. A process according to claim 9 wherein the solvent is selected from the group consisting of dimethylacetamide, dimethylformamide and dimethylsulfoxide.

12. A liquid phase process for preparation of 2-hexanone which comprises adding water to a reaction mixture comprising hexene-1, a catalyst comprising a water soluble salt of a metal of the platinum group, a quinone which is soluble in the reaction mixture and which has an oxidation potential higher than that of the platinum group metal, and a solvent selected from the group consisting of dimethylacetamide, dimethylformamide and dimethylsulfoxide, said water being added at a rate between 0.2 and 3.6 mols per hour per mol of hexene-1, said reaction mixture being at a temperature between 0° and 150° C., and wherein the water addition is continued until the water content reaches a total of from 1 to 50 weight percent of the amount of solvent.

13. A process according to claim 12 wherein the catalyst is palladium chloride, the quinone is para-benzoquinone and the solvent is dimethylformamide.

14. A liquid phase process for the preparation of 2-dodecanone which comprises adding water to a reaction mixture comprising dodecene-1, a catalyst comprising a water soluble salt of a metal of the platinum group, a quinone which is soluble in the reaction mixture and which has an oxidation potential higher than that of the platinum group metal, and a solvent selected from the group consisting of dimethylacetamide, dimethylformamide and dimethylsulfoxide, said water being added at a rate between 0.2 and 3.6 mols per hour per mol of dodecene-1, said reaction mixture being at a temperature between 0° and 150° C., and wherein the water addition is continued until the water content reaches a total of from 1 to 50 weight percent of the amount of solvent.

15. A process according to claim 14 wherein the catalyst is palladium chloride, the quinone is para-benzoquinone and the solvent is dimethylformamide.

16. A process according to claim 15 wherein the solvent is dimethylsulfoxide.

17. A process according to claim 1 wherein the water soluble salt of a metal of the platinum group is selected from the group consisting of platinum and palladium halides, sulfates and phosphates.

18. A process according to claim 17 wherein the soluble organic oxidizing agent is a quinone.

19. A liquid phase process for the preparation of a carbonyl containing compound which comprises adding water to a reaction mixture comprising:
- an unsaturated hydrocarbon having between 6 and 20 carbon atoms per molecule and wherein the unsaturation in said hydrocarbon resides solely in from 1 to 4 olefinic double bonds, and wherein there is at least one hydrogen atom on each carbon atom of at least one of said olefinic double bonds;
- a catalyst in an amount between 0.1 and 50 weight percent of said olefin, said catalyst comprising a water soluble salt of a metal of the platinum group selected from the class consisting of platinum and palladium halides, sulfates and phosphates;
- an organic oxidizing agent soluble in the reaction mixture comprising a quinone having an oxidation potential higher than that of the platinum group metal, the amount of said oxidizing agent being between 1 and 50 weight percent based on the total reaction mixture; and
- an aprotic organic solvent selected from the group consisting of dimethylacetamide, dimethylformamide and dimethylsulfoxide;
- said water being added to said reaction mixture at a rate between 0.2 and 3.6 mols of water per hour per mole of olefinically unsaturated hydrocarbon in the reaction mixture, said reaction mixture being at a temperature between 0° and 150° C.

20. A process according to claim 19 wherein the catalyst is platinum chloride.

References Cited

UNITED STATES PATENTS

| | | | |
|---|---|---|---|
| 3,076,032 | 1/1963 | Riemenschneider et al. | 260—533 |
| 3,024,290 | 3/1962 | Henne | 260—648 |

DANIEL D. HORWITZ, *Primary Examiner.*